United States Patent [19]
Senda

[11] Patent Number: 5,480,244
[45] Date of Patent: Jan. 2, 1996

[54] ARTICLE INFORMATION PRINTER HAVING MEANS TO MEASURE PRINT MEDIA SIZE

[75] Inventor: Kouji Senda, Shizuoka, Japan

[73] Assignee: Kabushiki Kaisha Tec, Shizuoka, Japan

[21] Appl. No.: 234,669

[22] Filed: Apr. 28, 1994

[30]    Foreign Application Priority Data

Apr. 30, 1993    [JP]    Japan .................................. 5-104770

[51] Int. Cl.$^6$ ..................................................... B41J 11/46
[52] U.S. Cl. ...................... 400/582; 400/630; 400/707.1; 400/709; 400/63; 400/74; 400/76
[58] Field of Search ..................................... 400/598, 619, 400/630, 705.3, 706, 707.1, 709, 583.3, 581, 613.2, 703, 708, 583, 586, 590, 61, 62, 63, 74, 76, 582, 596; 395/111; 226/45; 271/226, 227

[56]    References Cited

U.S. PATENT DOCUMENTS

| | | |
|---|---|---|
| 4,279,523 | 7/1981 | Ringle . |
| 4,590,859 | 5/1986 | Pou et al. ................................ 400/582 |
| 4,621,801 | 11/1986 | Sanchez ................................... 400/633 |
| 4,717,059 | 1/1988 | Takahashi . |
| 4,844,629 | 7/1989 | Hoyt ..................................... 400/583.3 |
| 4,871,272 | 10/1989 | Stein et al. . |
| 4,988,221 | 1/1991 | Shibayama et al. ..................... 400/583 |
| 5,055,670 | 10/1991 | Milne . |
| 5,061,947 | 10/1991 | Morrison et al. . |

FOREIGN PATENT DOCUMENTS 0397124    11/1990    European Pat. Off. .

OTHER PUBLICATIONS

Patent Abstracts of Japan, vol. 11, No. 372 (M–648) Dec. 4, 1987 & JP-A-62 146 661 (Tokyo Electric Co., Ltd.) Jun. 30, 1987.

Patent Abstracts of Japan, vol. 15, No. 228 (M–1123) Jun. 11, 1991 & JP-A-03 069 436 (Teraoka Seiko Co., Ltd.) Mar. 25, 1991.

*Primary Examiner*—Edgar S. Burr
*Assistant Examiner*—John S. Hilten
*Attorney, Agent, or Firm*—Frishauf, Holtz, Goodman, Langer & Chick

[57]    ABSTRACT

An article information printer is composed of a feeding mechanism for feeding continuous paper in which a series of label regions are provided, a SRAM for storing size data regarding a length of the label region, a printing head section for printing article information on the continuous paper fed by the feeding mechanism, and a control circuit for controlling the feeding mechanism on the basis of the size data stored in the SRAM to print the article information in the label region. Particularly, the control circuit has a feed sensing section for sensing ends of the label region from the continuous paper fed by the feeding mechanism, and a processing unit, responsive to start of power supply, for driving the feeding mechanism, measuring the length of the label region on the basis of a sensing signal from the sensing section which is obtained each time the continuous paper is fed by a preset distance, and setting a result of measurement in the SRAM as the size data.

8 Claims, 4 Drawing Sheets

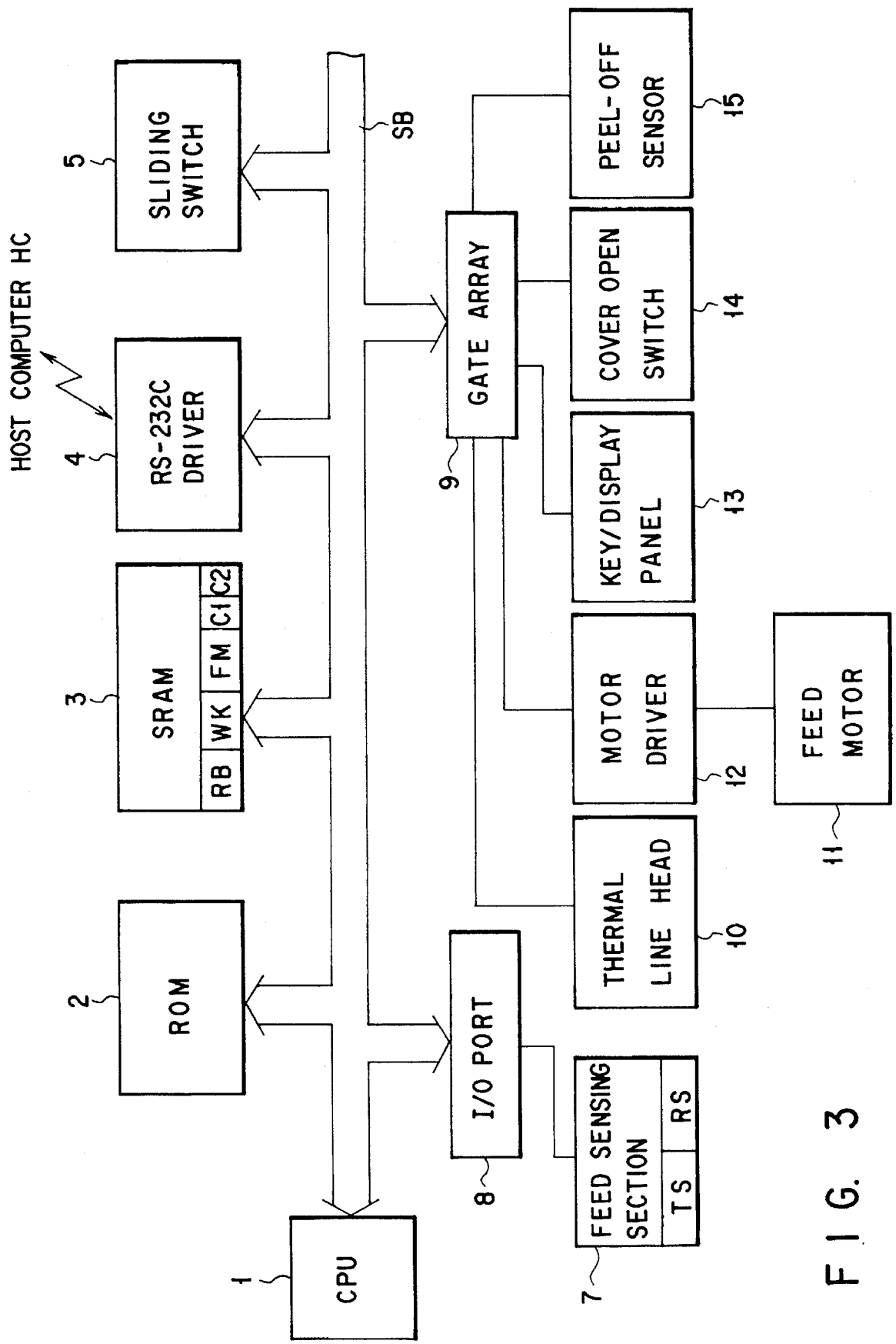
F I G. 3

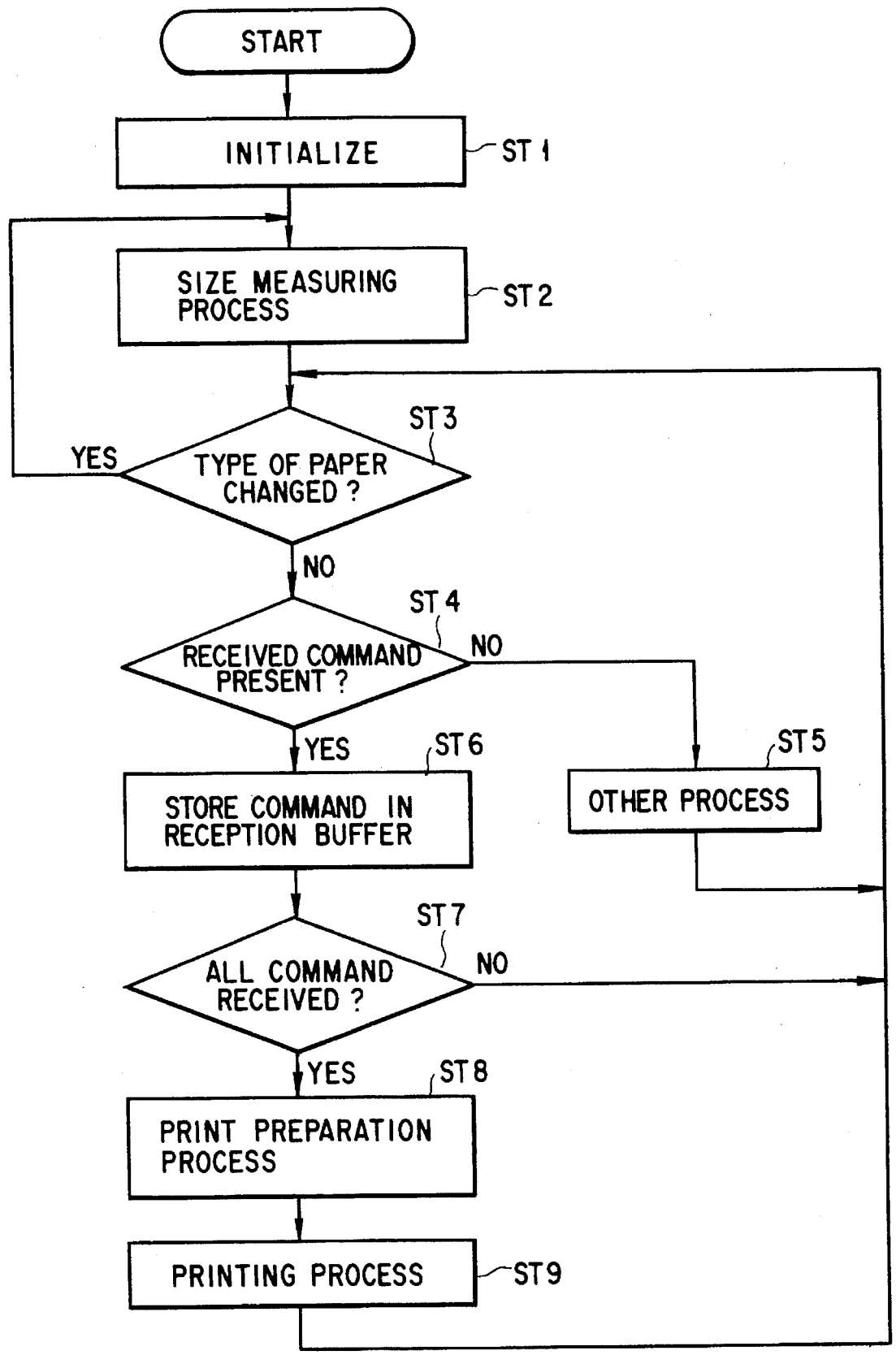
F I G. 4

ARTICLE INFORMATION PRINTER HAVING MEANS TO MEASURE PRINT MEDIA SIZE

BACKGROUND OF THE INVENTION

1. Field of the Invention

This invention relates to an article information printer which performs printing on various types of continuous paper.

2. Description of the Related Art

In large-scale retail stores or physical distribution, articles are managed on the basis of labels (including tags), which are attached to the articles so as to display article codes, article names and other article information items. The labels are issued by using an article information printer which prints the article information on a roll of continuous paper. A typical article information printer receives, from a host computer, various control commands, such as a label size setting command, a feed command, a format command, a label data command, etc., and performs a process of issuing labels according to the control commands.

The label size setting command contains size data representing a feed length equal to the distance between the front ends of adjacent label regions in the continuous paper, a label length equal to the distance between the opposite ends of each label region, and a space length equal to the rear end of the first label region and the front end of the second label region. The size data is used to determine the size of a printed pattern and to control the paper feed of setting the front end of each label region to a printing position.

Conventionally, the article information printer need not receive a label size setting command again to issue labels of the different contents but of the same size. In this case, the size data is retained in the printer until a new label size setting command is supplied, and used for a control of printing.

However, to retain the size data, power must be continuously supplied to the printer. The operator of the host computer is unable to omit the transmission of the label size setting command after another one uses the printer, since the operator cannot confirm whether the size data is erased due to an interruption of the power supply. If the transmission of the label size setting command is omitted where the size data is erased, a printing error occurs. At this time, the label size setting command must be supplied together with the other control commands. Further, such a printing error often occurs also when the transmission of the label size setting command has been erroneously omitted at the time of replacing the continuous paper with another type. This gives the operator the impression that the conventional article information printer has but low operability.

SUMMARY OF THE INVENTION

It is the object of the invention to provide an article information printer capable of reducing errors in printing.

To attain the object, there is provided an article information printer which comprises a feeding mechanism for feeding continuous paper in which a series of predetermined regions are provided; a volatile memory for storing size data regarding a length of the predetermined region; a printing head for printing article information on the continuous paper fed by the feeding mechanism; and a control circuit for controlling the feeding mechanism on the basis of the size data stored in the volatile memory to print the article information in the predetermined region, the control circuit having a sensor for sensing a distinguishable feature of the predetermined region from the continuous paper fed by the feeding mechanism, and a processing unit for driving the feeding mechanism at least upon start of power supply, measuring the length of the predetermined region on the basis of a sensing signal from the sensor which is obtained each time the continuous paper is fed by a preset distance, and setting a result of measurement in the volatile memory as the size data.

In the printer, even if the size data has been erased from the volatile memory due to an interruption of power supply, the length of the predetermined region is measured when power supply is resumed, and a result of the measurement is stored in the volatile memory as the size data. Accordingly, printing errors would not occur due to an absence of the size data, and hence the printer has higher operability than the conventional one.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate a presently preferred embodiment of the invention, and together with the general description given above and the detailed description of the preferred embodiment given below, serve to explain the principles of the invention.

FIG. 3 is a block diagram showing the circuit of the article information printer of FIG. 1;

FIG. 4 is a flowchart for explaining the operation of the article information printer of FIG. 1.

DETAILED DESCRIPTION OF THE EMBODIMENT

An article information printer according to one embodiment of the present invention will now be explained with reference to the accompanying drawings.

The article information printer prints article information on two types of continuous paper. The first one is used for separated label issue in which a label is issued by separating a printed portion from the reminder of the paper, and the second one is used for non-separated label issue in which a label is issued without separating a printed portion from the reminder of the paper.

Figure 1:
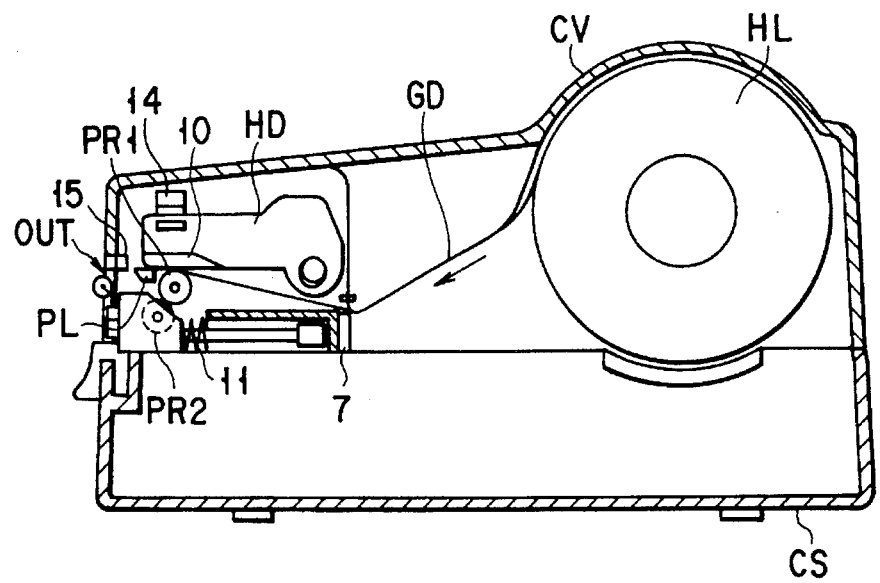
FIG. 1 is a cross sectional view showing the structure of an article information printer according to one embodiment of the present invention.
Figure 2:
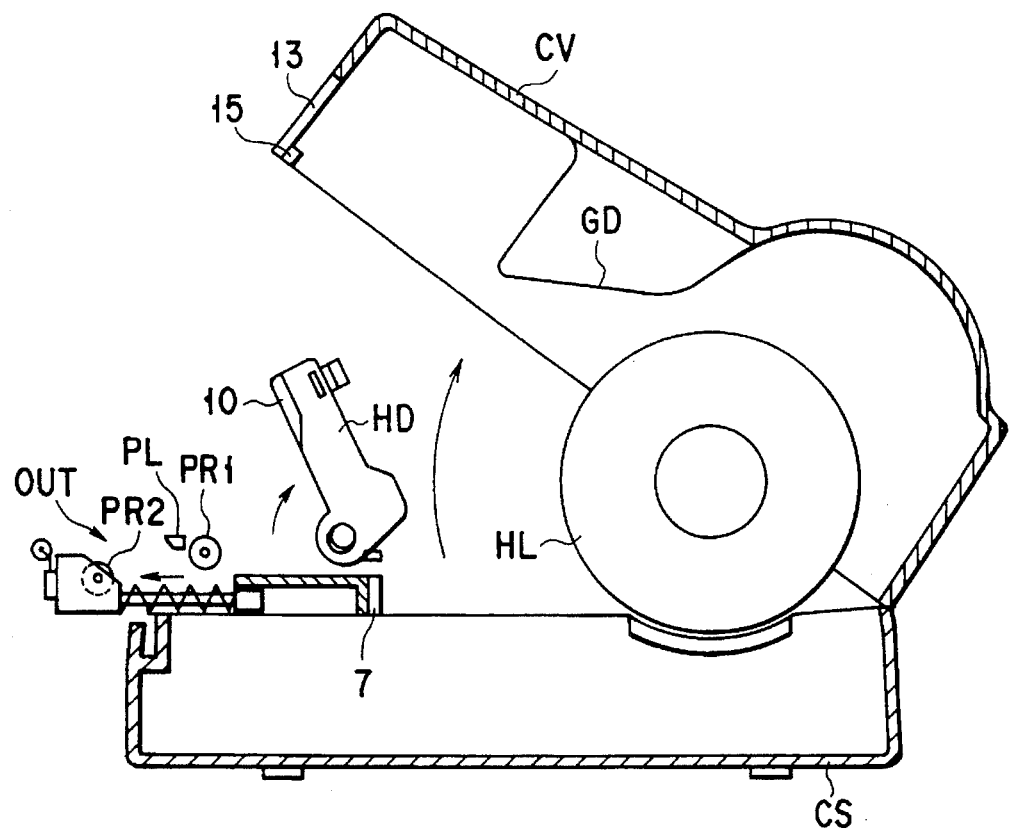
FIG. 2 is a cross sectional view showing the structure of the article information printer in a state where a cover is opened to exchange the continuous paper for a new one.

FIG. 1 shows the internal structure of the article information printer. This printer has a paper holder HL, a paper guide GD, a printing head section HD, a platen roller PR1, a peel-off roller PR2, a peel-off plate PL and a case CS. The case CS has a cover CV which can be opened as shown in FIG. 2. The paper holder holds continuous paper of each type rotatably hanged thereon in a state where the cover CV is opened. The cover CV is closed after the front end of the continuous paper is pulled from the paper holder HL to a label outlet OUT. At this time, the paper is urged against the platen roller PR1 from the side of the printing head section HD. The platen roller PR1 repeatedly feeds the continuous paper by a predetermined length or distance while the printing head section HD performs printing on a label region of the paper; and then feeds the paper to set the front end of the next label region to the printing position. In the case where the continuous paper for separated label issue has a series of label seals spaced from each other on a base sheet, the base sheet is adapted to be held between the platen roller PR1 and the peel-off roller PR2 after passing the peel-off plate PL. Each label seal is peeled off from the base sheet at the peel-off plate PL as the rollers PR1 and PR2 rotate, and supplied to the label outlet OUT.

FIG. 3 shows the circuit of the article information printer.

The printer includes a CPU 1 for controlling the overall operation of the printer, a ROM 2 storing a control program for the CPU 1 and fixed data, a static RAM (SRAM) 3 for temporarily storing data input to and output from the CPU 1, an RS-232C driver (communication interface) 4, a slide switch 5 which is switched when the type of the continuous paper on the paper holder HL is changed, a feed sensing section 7 for sensing the front and rear ends of a space between each adjacent pair of label regions, an input/output port 8 for supplying a sensing signal from the feed sensing section 7 to the CPU 1, and a gate array (input/output interface) 9 for controlling peripheral circuits. The CPU 1 is connected, by means of a system bus SB, to the ROM 2, the SRAM 3, the RS-232C driver 4, the slide switch 5, the input/output port 8 and the gate array 9. The feed sensing section 7 is connected to the input/output port 8.

The printer further includes a thermal line head 10 which performs printing on the continuous paper in units of one line, a feed motor 11 which rotates the platen roller PR1 to feed the continuous paper, a motor driver 12 for driving the motor 11, a key/display panel 13 having a key-input section and a display section for displaying the state of the printer, a cover open switch 14 for detecting that the cover CV is opened, and a peel-off sensor 15 for sensing a label seal supplied to the label outlet OUT. The thermal line head 10, the motor driver 12, the key/display panel 13, the cover open switch 14 and the peel-off sensor 15 are connected to the gate array 9. The feed motor 11 is connected to the motor driver 12.

The ROM 2 has a region which stores patterns of various characters (including numerals) and bar codes as the fixed data, and constitutes a pattern generator for generating a pattern corresponding to print data included in the label data command. The SRAM 3 has regions which respectively constitute a reception buffer RB for temporarily storing various control commands from the host computer HC, a work memory WK for storing various data set at the time of preparation of printing, a frame memory FM for storing, as a print pattern, a combination of patterns from the pattern generator, a first measuring counter C1 for use in measuring the label length, and a second measuring counter C2 for use in measuring the space length. The thermal line head 10 is provided at a tip portion of the printing head section HD so that it can be brought into contact with the platen roller PR1 via the continuous paper. The head 10 is driven according to the print pattern stored in the frame memory FM. The feed motor 11 is a pulse motor engaged with a gear (not shown) provided at an end of the platen roller PR1. The feed sensing section 7 includes a transmission-type optical sensor TS for sensing a space between each adjacent pair of label regions in continuous paper for separated label issue, and a reflection-type optical sensor RS for sensing marks printed at end portions of each label region in the lower or upper surface of continuous paper for non-separated label issue. In the case where the continuous paper for non-separated label issue has a series of label seals on a base sheet, the above-described space corresponds to a gap or cutout created between adjacent label seals on the base sheet. These optical sensors TS and RS are switched from one to the other by the slide switch 5. A sensing signal from the switched or selected optical sensor is used for confirming the positions of the front and rear ends of each label region while the continuous paper is fed. The key/display panel 13 includes, for example, various control keys such as a print start key and a paper feed key, a power switch, LEDs, and a display. One of the LEDs is lit when the power switch is turned on.

The host computer HC transmits various control commands such as a label size setting command, a feed command, format commands and label data commands. The label size setting command includes size data representing a feed length equal to the distance between the front ends of adjacent label regions in the continuous paper, a label length equal to the distance between the opposite ends of each label region, and a space length equal to the rear end of a first label region and the front end of a second label region. The size data is used to determine the size of a print pattern, i.e., the size of the frame memory FM, and also to determine a paper feed distance to set the front end of the label region to the printing position. The feed command includes control data for controlling the feed sensing section 7. The format command includes two-dimensional coordinate data, magnification data, style data, and rotation data of a character or a character string. The label data command includes codes of characters (or numerals) to be printed in the form of a character string or a bar code) as article information. The format command is prepared for each label data command.

The operation of the article information printer will now be explained.

The operator turns on the power switch of the printer after confirming that the slide switch 5 has been set to indicate the type of the continuous paper on the paper holder HL. Upon start of power supply, the CPU 1 performs the operation shown in FIG. 4 by executing the control program stored in the ROM 2. When the operation is started, the SRAM 3 and the RS-232C driver 8, etc., are initialized in step ST1. In step ST2, a size measuring process is performed on the continuous paper set on the paper holder HL. In this process, the length of each label region and the distance (space length) between adjacent two label regions are measured by using the optical sensor selected by the slide switch 5. (This process will be explained later, with reference to FIG. 5.) In step ST3, it is checked from the state of the slide switch 5 whether or not the continuous paper has been changed from one type to another. If it is detected that the type of the continuous paper is detected to be changed, step ST2 is executed again.

If, on the other hand, it is detected in step ST3 that the type of the continuous paper has not been changed, it is checked in step ST4 whether or not there is a control command received from the host computer HC. The received command, if any, is stored in the reception buffer RB in step ST6. In step ST7, it is checked whether or not all control commands required for issuing labels have been received. If there is any command which has not yet been received, step ST3 is executed again.

If it is detected in step ST7 that all the commands have been received, the CPU 1 performs a print preparation process in step ST9. In this process, each control command is read out from the reception buffer RB, and it is checked whether the read command is one of the label size setting command, the feed command, the format command and the label data command. If the read command is detected to be the label size setting command, a label size setting process is performed to determine the paper feed distance, the size of the frame memory FM and the like, according to the size data, and set them in the work memory WK. If the read command is detected to be the feed command, a feed condition setting process is performed to set the use or non-use of the sensor 15, and the like, in the work memory WK. If the read command is the format command, a format setting process is performed to set in the work memory WK two-dimensional coordinate data, magnification data, style data, rotation data of a character or a character string, etc. If the read command is the label data command, print image producing process is performed to convert codes of characters (or numerals) into a pattern of a character string or a bar code by means of the pattern generator, and to store them in the frame memory FM. If the read command is not included in the above ones, a reception error process is performed.

Subsequent to the print preparation process, the CPU 1 performs a printing process in step ST9. In the printing process, a print pattern is read from the frame memory FM in units of one line after confirming that a print start command is supplied, and the pattern is printed as an image in a label region of the paper. The continuous paper is fed by a preset distance for each printing of one line. When all the image of one label is formed in the label region, the paper is fed to set the front end of the next label region to the printing position. The printing process is finished after the required number of labels are issued. Subsequent to the printing process, the CPU 1 executes step ST3 again. In the case of separated label issue, the paper feed and the printing process for the next label is inhibited during the period when the printed label projected from the outlet OUT is not picked up and sensed by the peel-off sensor 15. Printing of the next label starts after confirming that the printed label is picked up, based on a signal from the sensor 15.

Figure 5:
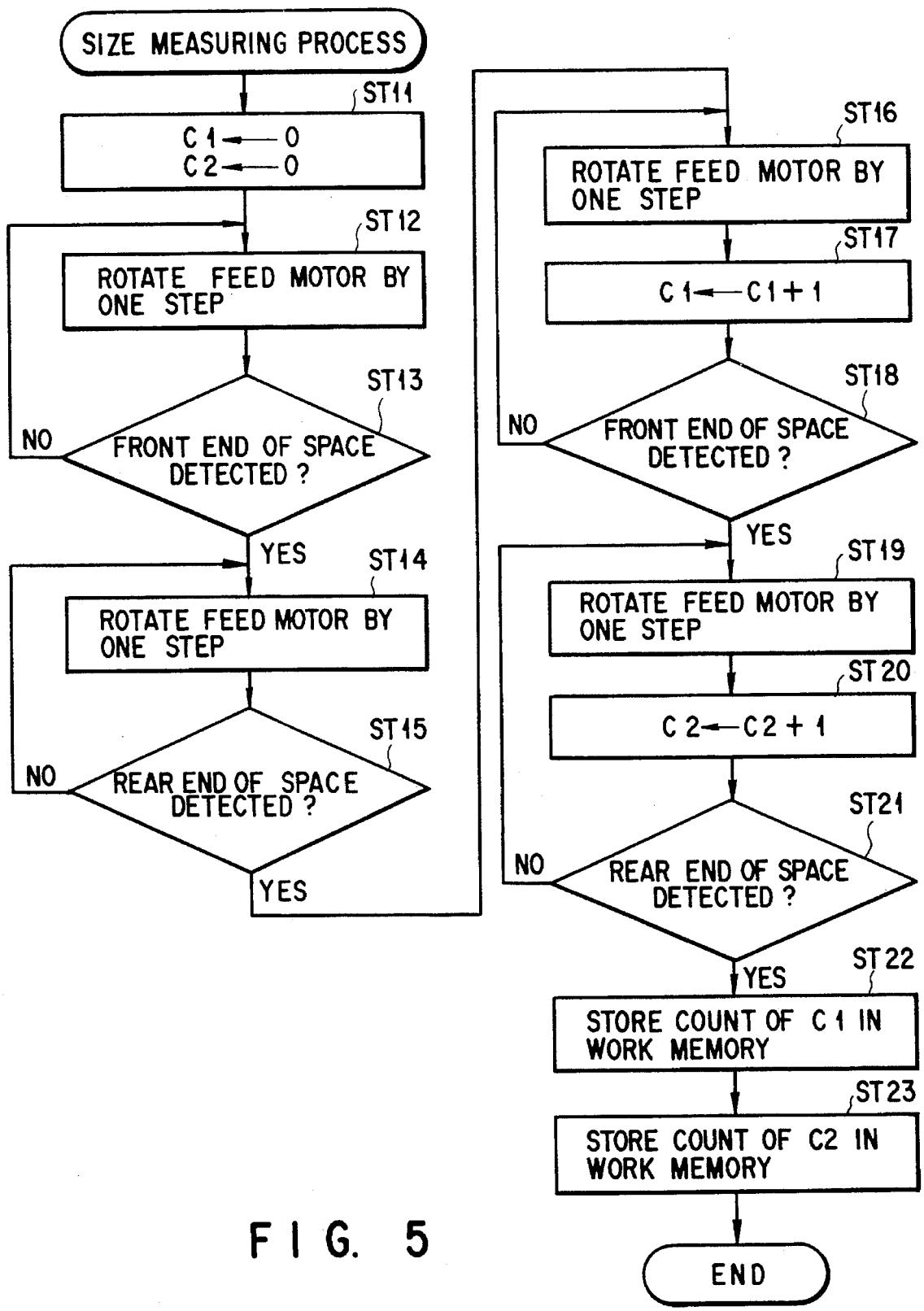
FIG. 5 is a flowchart for explaining, in more detail, a size measuring process shown in FIG. 4.

FIG. 5 shows in more detail the size measuring process shown in FIG. 4.

When the size measuring process is started, the CPU 1 clears in step ST11 the values of the first and second measuring counters C1 and C2 to an initial value "0", and enables in step ST12 the feed motor 11 to rotate by one step so as to feed the continuous paper, and checks in step ST13 whether or not the feed sensing section 7 has detected the front end of a space. Steps ST12 and ST13 are repeated until the front end of the space faces the feed sensing section 7 as the continuous paper is fed. Upon detection of the front end of the space, the CPU 1 enables in step ST14 the feed motor 11 to rotate by one step, and checks in step ST15 whether or not the feed sending section 7 has detected the rear end of the space. Steps ST14 and ST15 are repeated until the rear end of the space is detected as the continuous paper is fed. Upon detection of the rear end of the space, the CPU 1 enables the feed motor 11 to rotate by one more step in step ST16, then in step ST17 adds "1" to the count of the first measuring counter C1, and in step ST18 checks whether or not the feed sensing section 7 has detected the front end of the following space. Steps ST16–ST18 are repeated until the front end of the following space faces the feed sensing section 7 as the continuous paper is fed. Upon detection of the front end of the following space, the CPU 1 enable the feed motor 11 to rotate by one step in step ST19, then in step ST20 adds "1" to the count of the second measuring counter C2, and in step ST21 checks whether or not the feed sensing section 7 has detected the rear end of the following space. Steps ST19–ST21 are repeated until the rear end of the following space faces the feed sensing section 7 as the continuous paper is fed. Upon detection of the rear end of the following space, the CPU 1 stores in step ST22 the count of the first measuring counter C1 as a label length (i.e., the distance between the front and rear ends of each label region) in the work memory WK, and stores in step ST23 the count of the second measuring counter C2 as a space length (i.e., the distance between the rear end of a label region and the front end of the following label region) in the work memory WK. Size data such as the label length and the space length are retained in the work memory WK, unless the printer power is turned off or they are updated according to the label size command supplied from the host computer HC. The retained size data can be used in the above-described print preparation process and printing process so as to issue another label. The size measuring process terminates after the execution of step ST23.

As described above, in the above-described embodiment, sizes such as the label length and the space length are measured as regards continuous paper set on the paper holder HL, at the time when the power switch of the printer is turned on and at the time when the slide switch 5 is switched over, and are stored in the SRAM 3 in order to be used in the print preparation process and the printing process. Accordingly, no printing errors occur even if the transmission of the label size setting command is omitted in a case where the size data have been erased due to an interruption of the power supply to the printer. Further, no printing errors occur even if the transmission of the label size setting command is mistakenly omitted in a case where the type of the continuous paper has been changed. Thus, the article information printer of this embodiment has higher operability than the conventional one.

In the embodiment, the slide switch 5 is used for selecting the type of continuous paper. However, this switch 5 can be replaced with a dip switch, for example. Further, continuous paper may have marks printed at predetermined interval to indicate ends of each label region.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. An article information printer comprising:

a feeding mechanism for feeding continuous paper in which a series of predetermined regions are provided;

a volatile memory for storing size data representing a length of the predetermined region, wherein said size data is supplied from an external device to the printer;

printing means for printing article information on the continuous paper fed by said feeding mechanism; and control means for controlling said feeding mechanism on the basis of the size data stored in said volatile memory to print the article information in the predetermined region of the continuous paper;

wherein said control means includes:

sensing means for sensing a distinguishable feature of the predetermined region from the continuous paper fed by the feeding mechanism, and processing means, responsive to power supply which is resumed after a size data has been erased from the volatile memory due to an interruption of power supply, for driving said feeding mechanism, measuring the length of the predetermined region on the basis of a sensing signal from the sensing means which is obtained, as a result of sensing by said sensing means, each time the continuous paper is fed by a preset distance, and setting size data indicating the measured length of the predetermined region in said volatile memory to recover the erased size data.

2. An article information printer according to claim 1, wherein said processing means is further responsive to change in the type of continuous paper to update the size data.

3. An article information printer according to claim 2, wherein said processing means includes switch means for selecting the type of continuous paper.

4. An article information printer according to claim 1, wherein said processing means measures the length of the predetermined region together with a space between the predetermined regions.

5. An article information printer according to claim 1, wherein said sensing means includes sensors each assigned to a corresponding type of continuous paper.

6. An article information printer according to claim 1, wherein said distinguishable feature comprises a mark provided on continuous paper.

7. An article information printer according to claim 1, wherein said distinguishable feature comprises a cutout provided on continuous paper.

8. An article information printer according to claim 1, wherein said distinguishable feature comprises a gap provided on continuous paper.

* * * * *

UNITED STATES PATENT AND TRADEMARK OFFICE
CERTIFICATE OF CORRECTION

PATENT NO. : 5,480,244
DATED : January 2, 1996
INVENTOR(S) : Senda, Kouji

It is certified that error appears in the above-indentified patent and that said Letters Patent is hereby corrected as shown below:

Title page, Item [73] Assignee, "Tec" should be --TEC--

Signed and Sealed this

Ninth Day of April, 1996

Attest:

BRUCE LEHMAN

Attesting Officer

Commissioner of Patents and Trademarks